United States Patent [19]

Crowley, Jr.

[11] 4,165,712
[45] Aug. 28, 1979

[54] RODEO DEVICE

[76] Inventor: John C. Crowley, Jr., Keech Rd., R.D. #1, Branchport, N.Y. 14418

[21] Appl. No.: 825,935

[22] Filed: Aug. 19, 1977

[51] Int. Cl.² .................. B68B 1/00; A01K 15/02
[52] U.S. Cl. .................. 119/29; 273/105.2; 54/1
[58] Field of Search .......... 54/71, 1, 76, 44, 64, 54/23; 119/29, 110; 24/201 T, 201 R; 273/105.2

[56] References Cited

U.S. PATENT DOCUMENTS

| | | | |
|---|---|---|---|
| 3,139,863 | 7/1964 | Steinbach | 119/110 |
| 3,616,595 | 11/1971 | Townsend | 54/1 |
| 3,802,706 | 4/1974 | Hamm | 119/29 X |

*Primary Examiner*—Russell R. Kinsey
*Assistant Examiner*—Robert P. Swiatek
*Attorney, Agent, or Firm*—Stonebraker, Shepard & Stephens

[57] ABSTRACT

An object is releasably attachable to a fastener mounted on a girth strap fastened around an animal so that the object rides securely above the animal's back as the animal runs, and the object is removable from the fastener by means of a lariat or by manual grasping and removing. The fastener on the girth strap is preferably a pair of spring clips, and the object preferably has a holding strap securable in the spring clips, which are oriented to open rearwardly of the animal. The object is preferably shaped as a horned pommel to provide a convenient roping target, and roping the object from off the back of a calf saves wear and tear on horses, calves, and ropers, while realistically simulating actual calf roping.

8 Claims, 3 Drawing Figures

RODEO DEVICE

BACKGROUND OF THE INVENTION

Calf roping is a popular rodeo sport that is often rough on calves, horses, and the men and women who do it. In recognition of some of the problems, suggestions have been made for mechanical calves affording moving roping targets, but these are expensive, inconvenient, and poorly simulate the movements of a running calf.

The invention involves a realistic simulation of calf roping without requiring the strain and effort expended by people and animals in roping an actual calf. The invention aims at preserving the skill and interest involved in calf roping while greatly reducing the likelihood of injury to people and animals.

SUMMARY OF THE INVENTION

The inventive rodeo device includes a girth strap fastenable around an animal, a fastener mounted on the girth strap to be disposed in the region of the animal's back, and an object releasably attachable to the fastener to ride securely above the animal's back as the animal runs. The object can be forcibly removed from the fastener by a lariat or by hand. The fastener is preferably formed as a pair of spring clips spaced apart on the girth strap and oriented to open rearwardly of the animal, and the object preferably has a holding strap fastenable in the clips to hold the object on the girth strap between the clips. The object is preferably generally pommel shaped with simulated cattle horns extending outward from an upper region.

DRAWINGS

DETAILED DESCRIPTION

Figure 1:
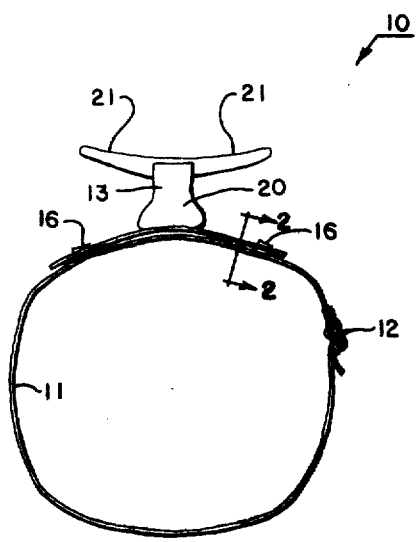
FIG. 1 is a rear elevational view of a preferred embodiment of the invention in the position it assumes when attached to an animal.
Figure 2:
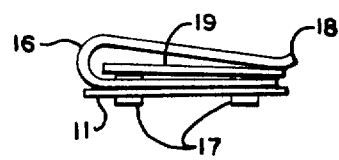
FIG. 2 is an enlarged, fragmentary cross sectional view of the embodiment of FIG. 1, taken along the line 2—2 thereof.
Figure 3:
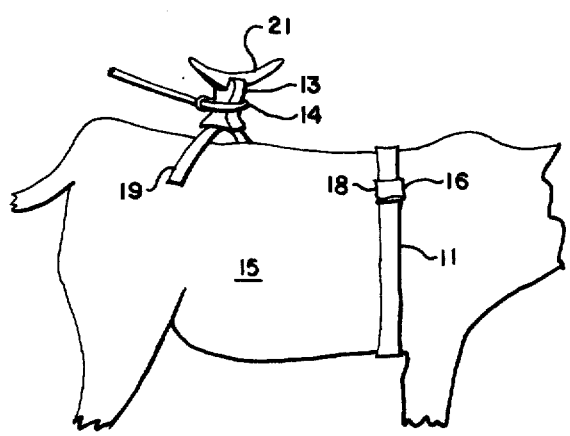
FIG. 3 is a perspective view of the embodiment of FIG. 1 partially removed from an animal's back by a lariat.

Roping device 10 as shown in the drawings includes a girth strap 11 that is fastenable around an animal such as by means of conventional D rings 12. Girth strap 11 is preferably formed of a tough and durable webbing material and is preferably fastened around a calf, just back of the forelegs. An object 13 is releasably attachable to girth strap 11 as explained more fully below so that object 13 can be forcibly removed from the animal. As best shown in FIG. 3, a lariat 14 can be used to rope and remove object 13 from calf 15, and object 13 can also be manually grasped by a horse rider and removed from animal 15.

A pair of spring clips 16 are mounted securely on girth strap 11 to be spaced apart by a little more than the width of object 13. Spring clips 16 can be attached to girth strap 11 by rivets 17 or other fastening means, and each of the spring clips 16 has an open end 18 oriented in the same direction so that when girth strap 11 is fastened around an animal, spring clips 16 are both oriented to open rearwardly of the animal. Object 13 has a holding strap 19 that is preferably secured to the bottom of object 13 to extend outward on both sides of object 13. Holding strap 19 is slid into spring clips 16 to hold object 13 between clips 16 on top of girth strap 11 so that object 13 rides securely above the animal's back as the animal runs. Spring clips 16 are preferably 3 cm or more wide and are preferably formed of metal to provide a firm and secure grip on holding strap 19 so that object 13 will not accidentally come off the animal's back. Other fastening devices can be used to secure object 13 on girth strap 11, but experience shows that spring clips 16 are preferred. Also, instead of a single holding strap 19 fastened to the bottom of object 13, a pair of separate straps can be fastened to opposite sides of object 13, or object 13 can be formed with integral strap members attachable to clips 16.

Object 13 can have many shapes, but the illustrated shape is preferred. Also, object 13 can be formed of many different materials, but molded resin material is preferred. As illustrated, object 13 has a generally pommel-shaped body 20 extending upward from girth strap 11 above the animal's back, and simulated cattle horns 21 extend outward from the upper region of body 20. Horns 21 are oriented to extend in the same general direction as holding strap 19, so that horns 21 are generally transverse to the animal when object 13 is mounted on the animal's back. Object 13 thus provides a pair of simulated cattle horns mounted above the animal's back to afford a moving target as the animal runs.

In use, girth straps 11 are fastened around any desired number of calves or other animals for roping practice or rodeo events, and the girth straps are all oriented so that spring clips 16 open rearwardly of each animal. Then an object 13 is manually attached to a girth strap by sliding holding strap 19 into spring clips 16. An animal 15 carrying an object 13 on its back is released and runs to carry object 13 along as a realistic simulation of a running calf. The animal is pursued by a horse rider, who ropes object 13 with a lariat and forcibly removes it from the animal by pulling rearwardly of the animal to yank holding strap 19 out of spring clips 16. Horns 21 provide a realistically moving target, and pommel-shaped body 20 serves as a "neck" where the lariat can tighten. An alternative is for the rider to ride alongside the running animal, reach down, and manually grasp and remove object 13 from the animal's back.

The invention thus requires roping and riding skill for practice or competition without putting as much wear and strain on animals and riders as is required for roping actual calves. Younger and older people and more women can participate in simulated calf roping by using the invention, horses can participate longer with fewer injuries, and calves are spared the injuries and rough handling that calf roping involves.

What is claimed is:

1. A rodeo device comprising:
   a. a girth strap fastenable around an animal;
   b. a fastener mounted on said girth strap to be disposed in the region of said animal's back;
   c. said fastener being formed as a pair of spring clips spaced apart on said girth strap and oriented to open rearwardly of said animal;
   d. a ropable and manually graspable object releasably attached to said fastener to ride securely above said animal's back as said animal runs; and
   e. said object being removable from said fastener by being pulled rearwardly of said animal.

2. The rodeo device of claim 1 wherein said object has a holding strap fastened in said clips to hold said object on said girth strap between said clips.

3. The rodeo device of claim 1 wherein said object is generally pommel shaped.

4. The rodeo device of claim 1 wherein said object is shaped to form simulated cattle horns extending outward from an upper region of said object.

5. The rodeo device of claim 1 wherein said object has a generally pommel-shaped body extending upwardly from said girth strap and having simulated cattle horns extending outward from an upper region of said body.

6. The rodeo device of claim 5 including a holding strap extending outward on opposite sides of said body for attachment to said spring clips.

7. The rodeo device of claim 6 wherein said holding strap is secured to a bottom region of said body.

8. The rodeo device of claim 6 wherein said simulated cattle horns are oriented to extend in the same direction as said holding strap.